Inventors:
John R. Nalbach
Adolph Haupt
By Sheridan, Davis & Cargill attys.

Patented Sept. 4, 1945

2,384,390

UNITED STATES PATENT OFFICE 2,384,390

BAKE OVEN

John R. Nalbach, Oak Park, and Adolph Haupt, Chicago, Ill., assignors to Middleby-Marshall Oven Co., Chicago, Ill., a corporation of Illinois Application March 8, 1943, Serial No. 478,468

2 Claims. (Cl. 107—57)

This invention relates to improvements in bake ovens.

In bake ovens of endless conveyor or traveling types a longitudinal fire tunnel frequently is provided within which a burner, such as an oil or gas burner, projects the hot combustion gases. Such tunnels generally are located centrally in the lower portion of the baking chamber and in some instances may extend substantially from one end of the oven to the other. The tunnel may be formed of fire brick or other refractory material and in one form of heating system, the tunnel communicates at the forward end with a transverse header or manifold from which extends rearwardly, on each side of the centrally located tunnel, a bank or plurality of heat radiating ducts. These ducts may terminate at their rear ends in a receiving duct from which the gases are discharged to a stack.

The present invention relates generally to ovens of the type mentioned and one object of the invention is to provide, in addition to the lower heating means, an improved heat distributing system that affords a source of controllable top heat, that is, a source of uniform heat above the upper run of the conveyor that will give the desired color to the bakery products.

Another more specific object of the invention is to provide an oven having temperature equalizing means for receiving and mixing the individual streams of hot gases flowing from the lower banks of heat radiating ducts and utilizing the residual heat of those gases for heating over-head ducts which may be substantially coextensive in width with the baking chamber, for coloring the products as they move in close proximity to those ducts during the baking operation.

An additional object of the invention is to provide means for inducing and controlling the circulation of hot gases through the heat radiating system whereby the desired heating effects can be obtained.

Other objects of the invention will be apparent from a consideration of the following specification and accompanying drawings wherein.

Figure 1:
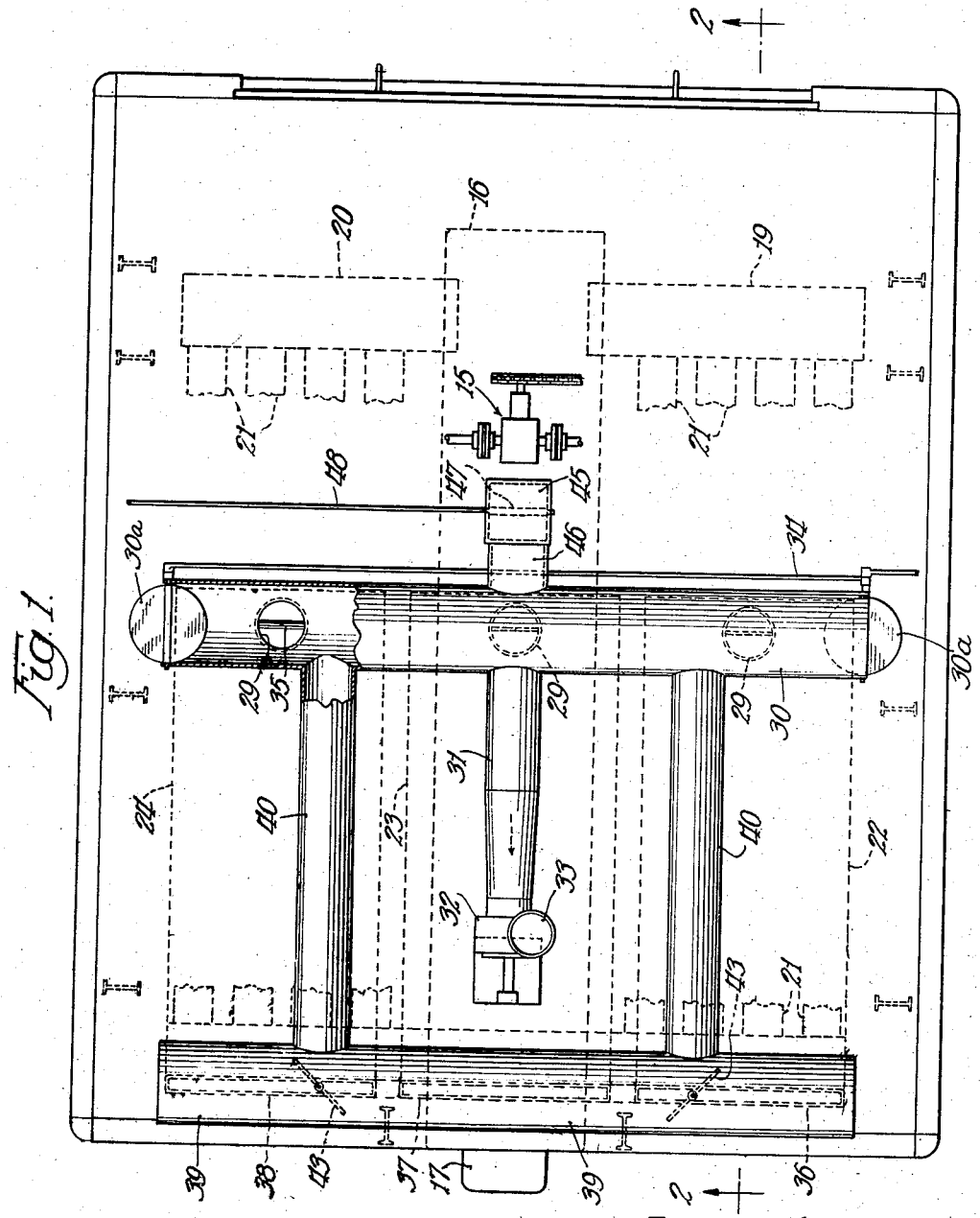
Fig. 1 is a top plan view of an oven embodying the present improvement.

In the drawings an oven structure is shown indicated generally by numeral 10 which comprises insulated walls defining a baking chamber 11. Within the chamber is an endless conveyor 12 provided with trays 13 for supporting the products to be baked. The conveyor 12 is operable by any suitable means such as a chain 14, operable from a source of power 15. The construction of the oven chamber inclosure per se is no part of the present improvements.

Figure 4:
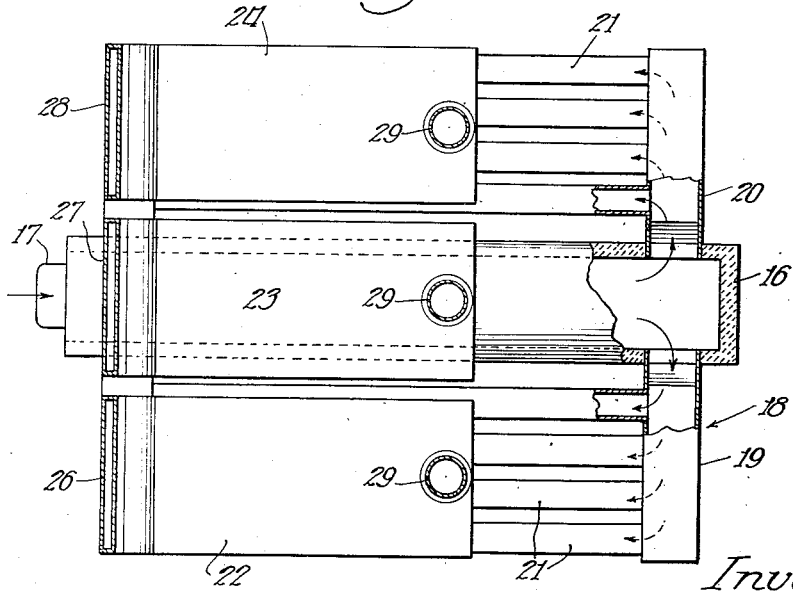
Fig. 4 is a broken sectional view taken on line 4—4 of Fig. 2.

Within the baking chamber 11 is a fire tunnel 16 within which at the rear open end thereof may be located a suitable burner 17 such as a gas burner, oil burner or other suitable source of heat. The burner projects hot gases forwardly within the tunnel 16 from which the gases flow into a forward manifold indicated generally by the numeral 18. The manifold is shown as comprising two laterally extending sections 19 and 20, see Fig. 4. Extending rearwardly from the manifold 18 are two banks of heat radiating ducts each indicated by the numeral 21. The ducts 21 carry the hot gases rearwardly of the oven and constitute the main source of supply of the bottom heat within the baking chamber. Some heat is radiated from the fire tunnel.

Figure 3:
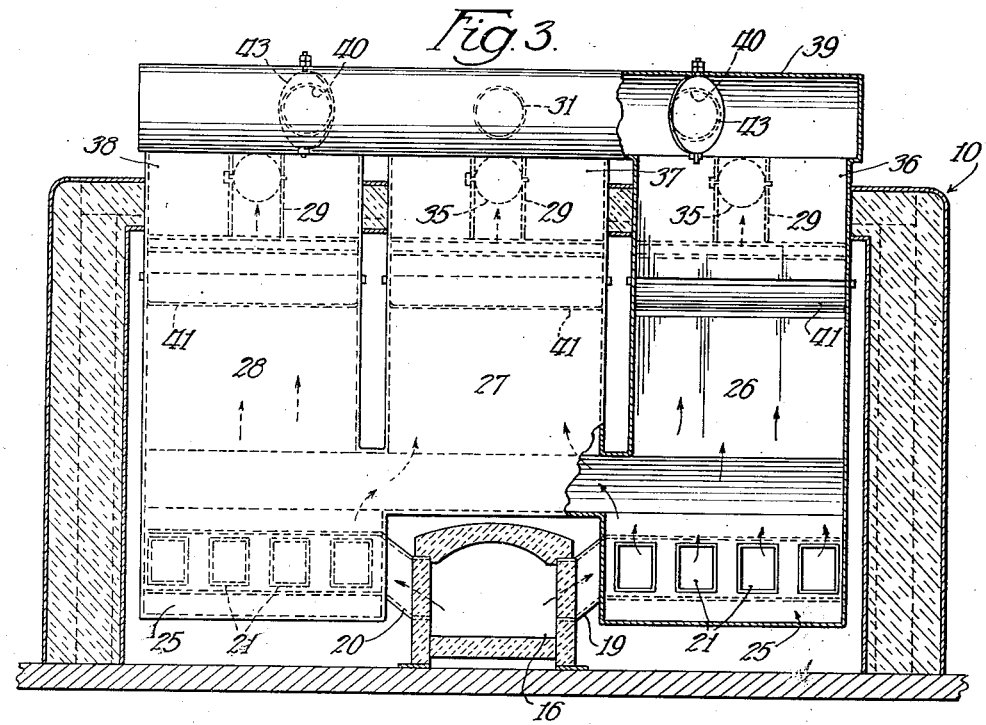
Fig. 3 is a vertical sectional view taken on line 3—3 of Fig. 2.

For the purpose of providing a source of top heat of the oven for coloring the baking products in instances where such is desirable, upper heat radiating ducts are provided. Three of such ducts 22, 23 and 24 are shown for the purpose of illustration, (see Fig. 4) which ducts constitute a source of top heat, the total width of which source is substantially coextensive with the width of the oven or of the baking chamber. The hot gases from the lower ducts 21 are conducted to the upper ducts 22, 23 and 24, but since the upper ducts might not be uniformly heated with the hot gases from the separated banks of lower ducts 21 if the gases were conducted directly to the upper ducts, a heat equalizing receptacle is interposed between the upper and lower ducts. The receptacle is indicated by the numeral 25 and may comprise a sheet metal structure located in the rear of the baking chamber and extending substantially the entire width of the baking chamber. As shown in Fig. 3, the receptacle 25 has substantial gas holding capacity and is shaped to span the tunnel 16 whereby the gas streams delivered to the receptacle by the two banks of ducts 21 are enabled to commingle to form a body or volume of gas of substantially uniform temperature. From the chamber 25 the gas is conducted to the upper ducts 22, 23, and 24 by means of vertical conduits 26, 27, and 28 respectively. The receptacle 25 thus constitutes a gas mixing or equalizing chamber which receives all the gas streams from the individual ducts 21, effects a commingling of the same and from which by means of the vertical ducts 26—28 the upper ducts 22—24 are supplied with gases of substantially uniform temperature.

Figure 2:
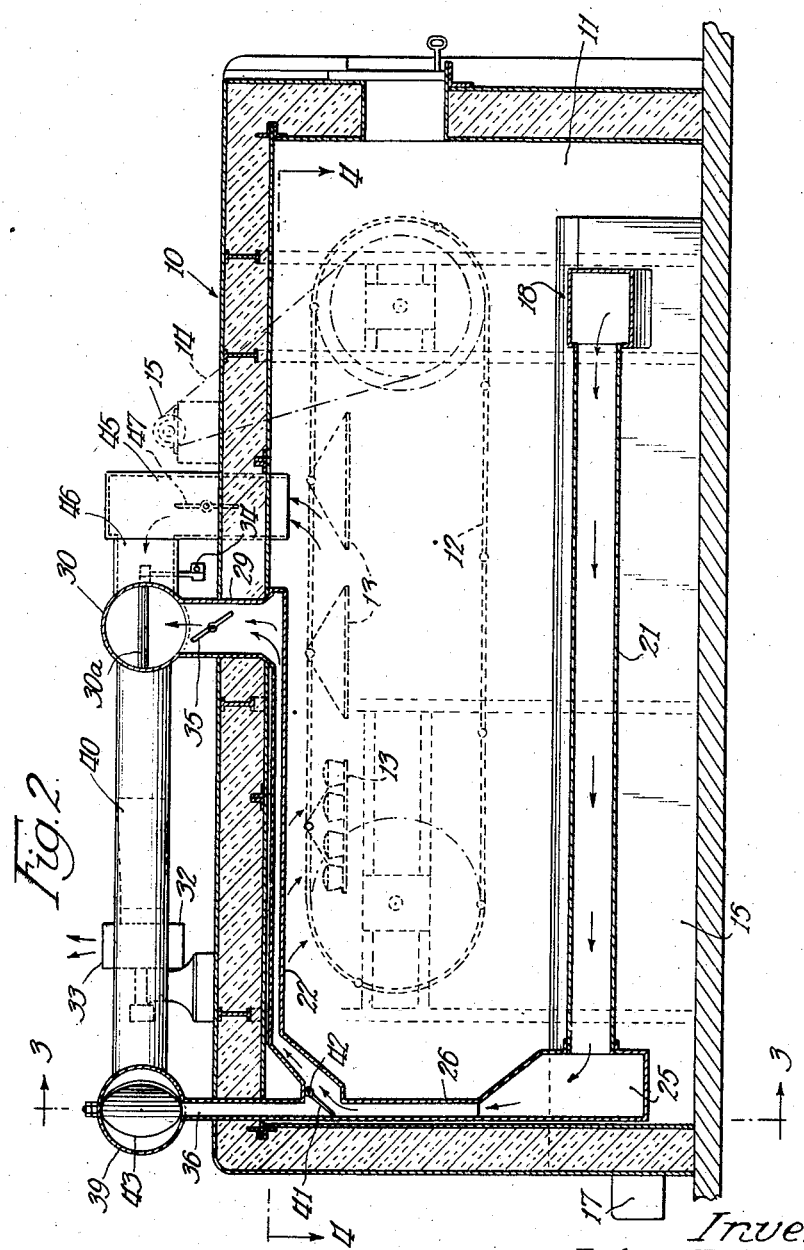
Fig. 2 is a vertical sectional view taken on line 2—2 of Fig. 1.

The upper ducts 22—24 extend forwardly of the baking chamber a suitable distance to insure adequate heating for coloring the bakery products. In the oven illustrated, the upper ducts extend forwardly substantially one-half the length of the oven. The forward ends of the ducts 22—24 communicate with vertical outlets each indicated by the numeral 29 which communicate with a transverse header or manifold 30 constituting a portion of the gas circulating means positioned above the oven structure. Extending rearwardly from the central portion of the manifold 30 is a duct 31 which communicates with the intake of a motor operated fan 32, the outlet of which fan communicates with a stack or exhaust 33 which may direct the gases to the exterior of the building as to a stack, for example. The fan 32 induces a circulation of the hot gases forwardly through the tunnel 16, thence rearwardly through the lower ducts 21 and into the mixing chamber 25 whence the gas streams of uniform temperature pass upwardly through the conduits 26, 27, and 28 into the upper ducts 22, 23, and 24 respectively, thence through the conduits 29 to the manifold 30 from which the gases flow through the duct 31 to the fan 32 and exhaust through the member 33. As shown in Fig. 2, the bakery products carried by the various trays 13, pass in relatively close proximity to the upper ducts 22—24 which constitute a source of relatively dry heat for the bakery products and by means of which the products such as bread, rolls, etc. can be desirably colored.

The ends of the manifold 30 are shown as provided with dampers or valves 30a which when closed exclude the outside air from the manifold. However, the dampers may be moved to open position, such as is shown in Fig. 1, when desired by means of any suitable operating link or rod mechanism 34. By opening the dampers either wholly or partially, regulated quantities of outside air can be drawn into the manifold 30 by the constant speed fan 32 the effect of which is to reduce the rate of flow of gas through the heat radiating system within the baking chamber. Each of the vertical upright conduits 29, preferably is provided with a damper 35 whereby the relative flow of hot gases through the ducts 22—24 may be controlled for individually controlling the flow of gases through said upper ducts for effecting heat control of the same.

Inasmuch as the additional top heat such as is afforded by the ducts 22—24 is not required in baking certain products, means are provided for causing the hot gases which rise through the vertical ducts 26—28 to by-pass the upper ducts 22—24. Such means comprises vertical ducts 36, 37 and 38 which in effect are but vertical extensions of ducts 26, 27, and 28, respectively. The ducts 36—38 preferably communicate with a transverse manifold 39 located above the oven as shown in Fig. 2 and which communicates with the forward manifold 30 by means of a pair of horizontal ducts each indicated by the numeral 40. A damper is provided at the junction of each of the ducts 22—24 with the corresponding ducts 26—28, the dampers each being indicated by the numeral 41. The dampers 41 preferably are mounted on a single operating rod 42 as shown in Fig. 2 whereby they can be simultaneously moved from one extreme position to the other or to intermediate positions. In the position shown in Fig. 2, the dampers are shown in position to direct all the hot gases rising from the temperature equalizing chamber 25 into the upper ducts 22—24. By swinging the dampers counter-clockwise, the gas streams may be divided whereby only a portion of the rising gas streams will be diverted into said upper ducts or the dampers may be moved to the extreme counter-clockwise position so as to divert all the rising gases into the vertical ducts 36—38, thus by-passing the upper radiating ducts 22—24. By the arrangement shown, it will be seen that without altering the rate of gas flow through the lower ducts 21, the quantity of gas which is delivered to the upper ducts 22—24 may be varied as desired to afford the required top heat, or all the gas may be by-passed around the top heat ducts when desired.

Within the manifold 29 there is preferably provided a pair of dampers 43 each located adjacent the intake end of the flues 40 and adjusted in such position as to insure uniform flow of gases upwardly through the ducts 36, 27, and 38. Once the proper positions of the dampers 43 are determined, generally no further adjustment of the same is required.

Since frequently it is desired to reduce the temperature of a bake oven substantially, an exhaust duct 45 is provided in the upper wall of the oven which communicates as by a duct 46 with the manifold 30. A damper or valve 47 is provided in the duct 45 which may be operated by any suitable means such as a rotatable rod 48. When the fan is in operation it will draw hot air from the baking chamber whenever the damper 47 is opened, thus quickly reducing the temperature of the baking chamber.

By means of the present arrangement suitable top heat is provided in the baking chamber for coloring the bakery products in instances where such is desirable, the source of top heat being rendered uniform by reason of equalizing chamber 25 into which the lower ducts 21 discharge their individual gas streams as above described. One exhaust fan serves to induce circulation through the heating system including the ducts 21 and 22—24 as well as to induce circulation through the exhaust system on the exterior of the oven including the by-pass ducts 36, 37 and 38 and manifold 39 and flues 40. The same fan is utilized for quickly reducing the temperature of the baking chamber by exhausting hot air and vapor from the baking chamber through the exhaust duct 45 when desired. The various controls, that is, the valves and dampers referred to, enable a baker not only to effect equalization of the heating effects of the different ducts, but permit the use of a single fan for effecting the selected variations in the heat distributing system as described above.

While we have shown and described a particular embodiment of the invention it will be apparent that various changes in the structure illustrated may be made without departing from the spirit of the invention.

We claim:

1. A bake oven comprising a baking chamber, a longitudinally arranged fire tunnel in the lower part of the oven provided with heating means at one end and a transverse manifold at the other end thereof, a plurality of longitudinally arranged heating ducts extending from said manifold on each side of said tunnel and terminating adjacent said first end of the oven, a gas receiving receptacle with which each of said ducts communicates and into which said ducts discharge hot gases received from said manifold, a plurality of vertical ducts extending from said receptacle along said first mentioned end of the oven, upper horizontal ducts each communicating with one of said vertical ducts and disposed adjacent the upper wall of the chamber, exhaust flues for each of said upper ducts extending through the top of the oven, a gas induction means connected to each of said flues for inducing flow of gases through said upper ducts from said receptacle for reducing the gas pressure in the latter and inducing a substantially uniform flow of gas through said lower ducts to provide uniformity of heat release in the bottom portion of the oven, and valve means for each of said gas exhaust flues adapted to be adjusted from the exterior of the oven for varying the rate of gas flow through said upper ducts for controlling the release of heat in the upper part of the oven.

2. A bake oven comprising a baking chamber, a longitudinally arranged fire tunnel in the lower part of the oven provided with heating means at one end and a transverse manifold at the other end thereof, a plurality of longitudinally arranged heating ducts extending from said manifold on each side of said tunnel and terminating adjacent said first end of the oven, a gas receiving receptacle with which each of said ducts communicates and into which said ducts discharge hot gases received from said manifold, a plurality of vertical ducts extending from said receptacle along said first mentioned end of the oven, upper horizontal ducts each communicating with one of said vertical ducts and disposed adjacent the upper wall of the chamber, exhaust flues for each of said upper ducts extending through the top of the oven, a gas induction means connected to each of said flues for inducing flow of gases through said upper ducts from said receptacles for reducing the gas pressure in the latter and inducing a substantially uniform flow of gas through said lower ducts to provide uniformity of heat release in the bottom portion of the oven, valve means for each of said gas exhaust flues adapted to be adjusted from the exterior of the oven for varying the rate of gas flow through said upper ducts for controlling the release of heat in the upper part of the oven, gas exhaust means each communicating with one of said vertical ducts and with the oven exterior, and valve means for directing the flow of some or all the gases in said vertical ducts through said exhaust means for controlling the flow of hot gases through said upper horizontal ducts for varying the rate of heat release thereof.

JOHN R. NALBACH.
ADOLPH HAUPT.